Figure 10:
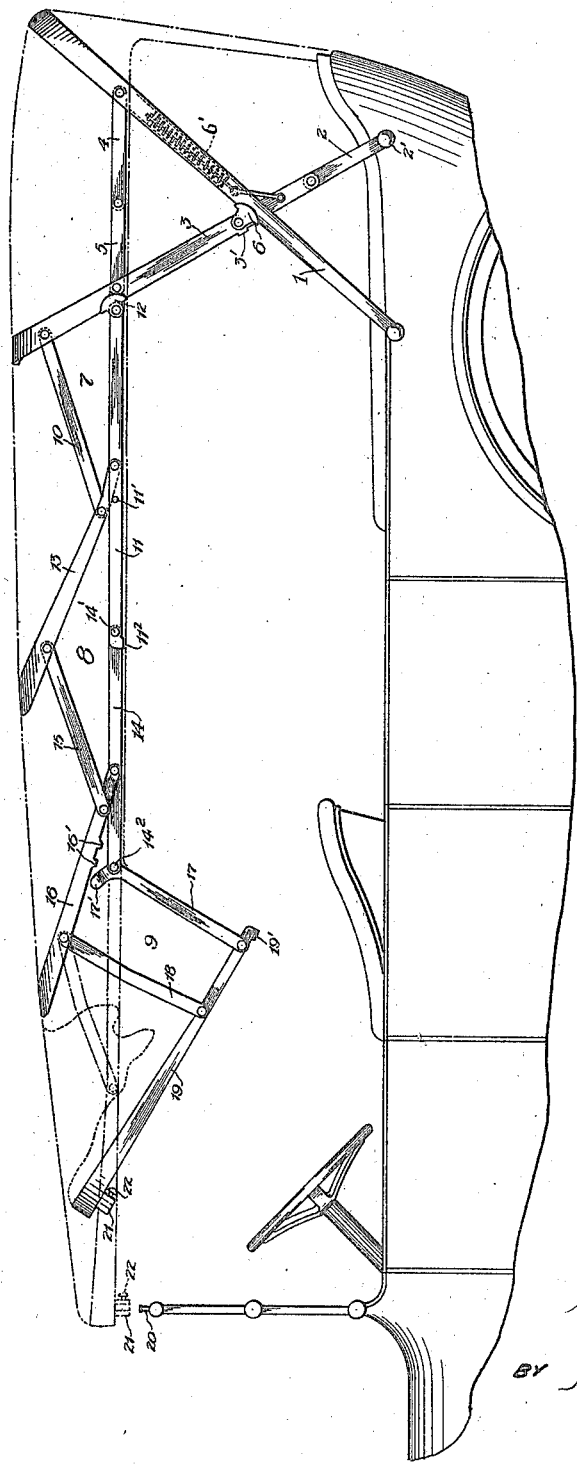

Feb. 20, 1923.  1,445,659
G. E. BISHOP
FOLDING VEHICLE TOP
Filed July 29, 1918  4 sheets-sheet 1
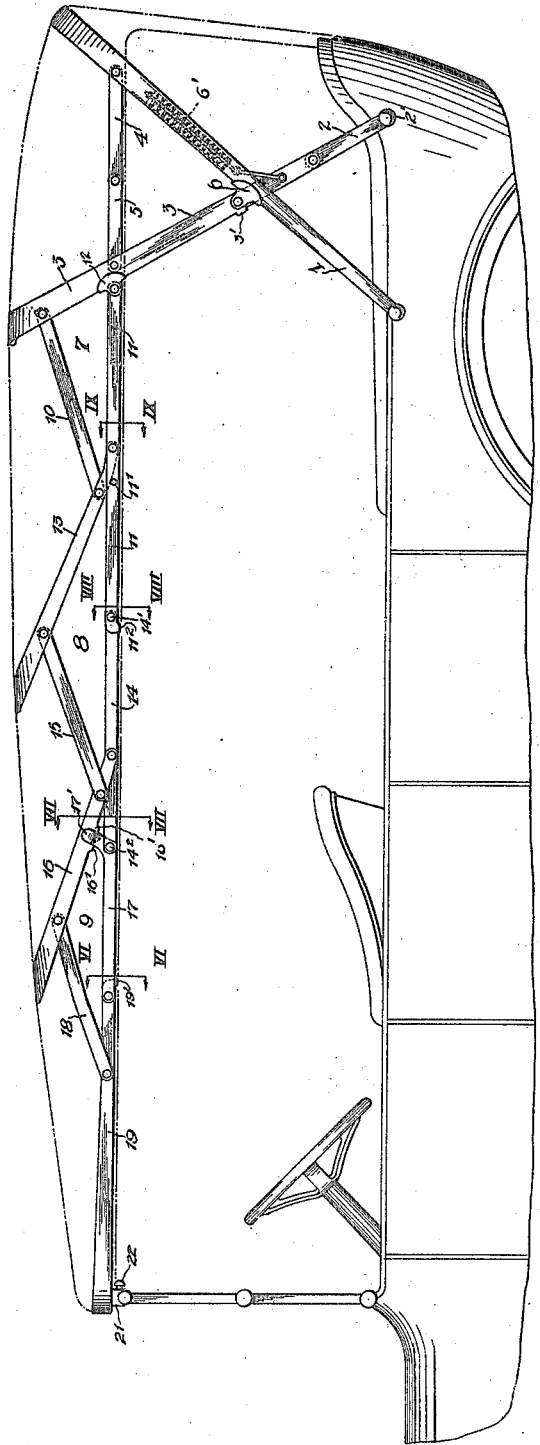
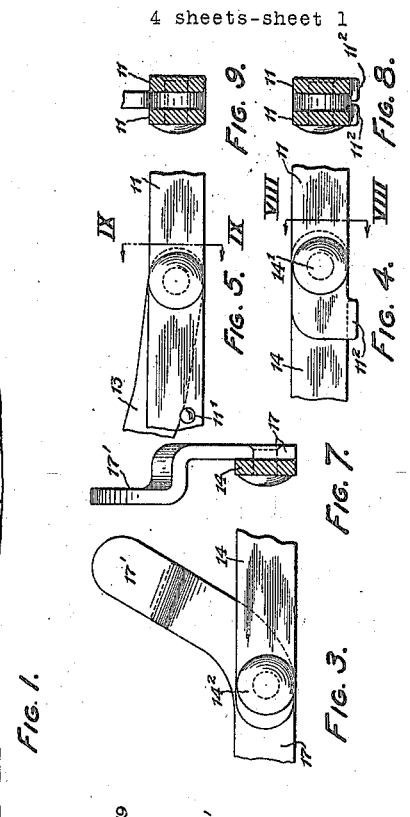
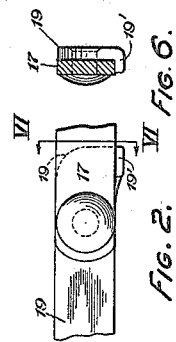
INVENTOR:
George E. Bishop
BY Merkel and Sagwell
ATTORNEYS Feb. 20, 1923.

G. E. BISHOP

FOLDING VEHICLE TOP

Filed July 29, 1918

1,445,659

4 sheets-sheet 2

INVENTOR:
George E. Bishop
BY Merkel and Saywell
ATTORNEYS.

Feb. 20, 1923.

G. E. BISHOP 1,445,659

FOLDING VEHICLE TOI

Filed July 29, 1918

4 sheets-sheet 3

INVENTOR:
George E. Bishop
BY Merkel and Saywell
ATTORNEYS

Patented Feb. 20, 1923.

1,445,659

UNITED STATES PATENT OFFICE.

GEORGE E. BISHOP, OF CLEVELAND, OHIO.

FOLDING VEHICLE TOP.

Application filed July 29, 1918. Serial No. 247,295.

*To all whom it may concern:*

Be it known that I, GEORGE E. BISHOP, a citizen of the United States, resident of Cleveland, county of Cuyahoga, and State of Ohio, have invented new and useful Improvements in Folding Vehicle Tops, of which the following is a specification; the principle of the invention being herein explained, and the best mode in which I have contemplated applying that principle, so as to distinguish it from other inventions.

My invention relates to automobile tops and particularly to a frame therefor by the operation of which the top may be folded and unfolded. Particularly, the invention relates to such a foldable top as is defined by the term "one-man top" and is designed to provide a structure of this class which shall be very easily and satisfactorily operated, economical, and of pleasing appearance. My improved design of tops comprehends a rear self-contained bearing and supporting member, an outrigger bow, an intermediate articulated member, supported truss or trusses, and other connected elements, all cooperating in the manner and for the purposes hereinafter fully described and claimed.

The annexed drawings and the following description set forth in detail certain means embodying my invention, the disclosed means constituting, however, but one of various mechanical forms in which the principle of the invention may be employed.

Figure 11:
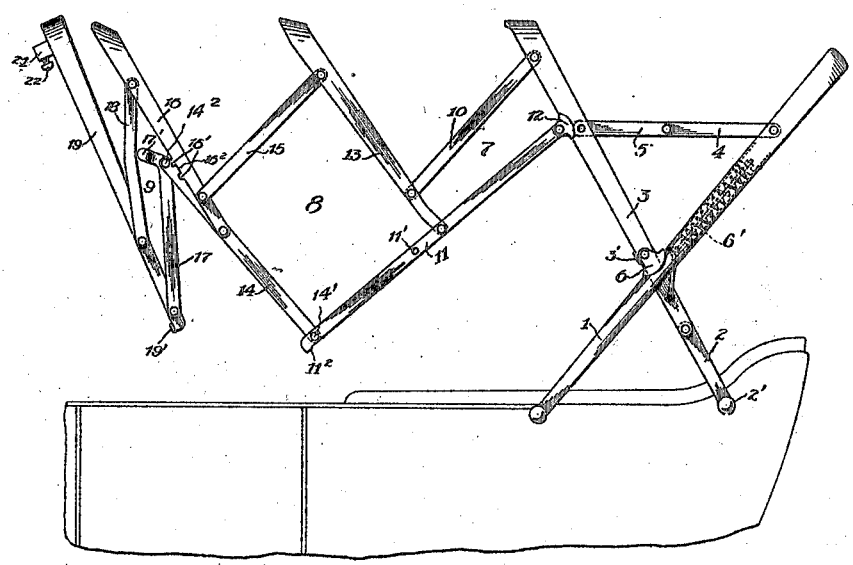
Figure 12:
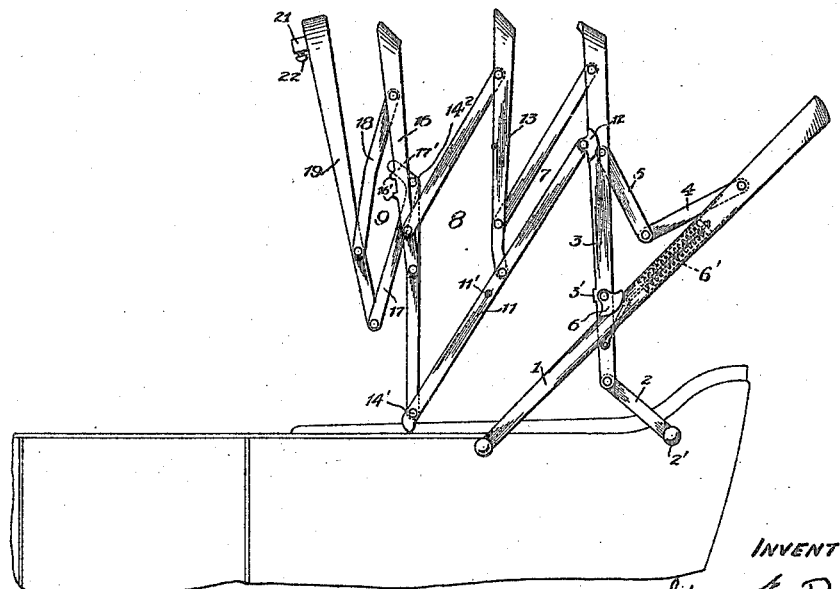
Figure 17:
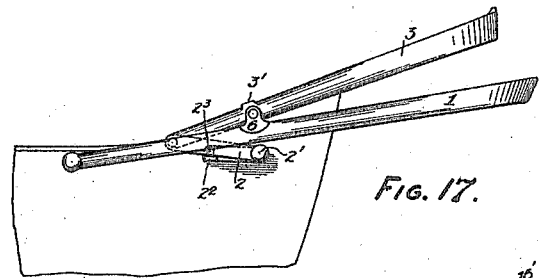
Figure 13:
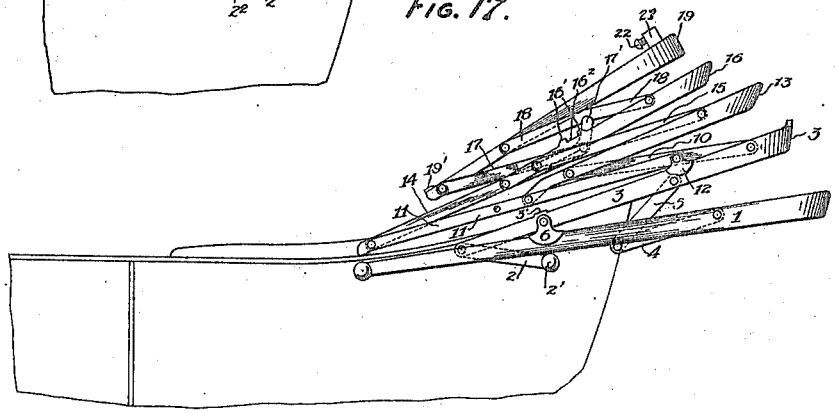
Figure 14:
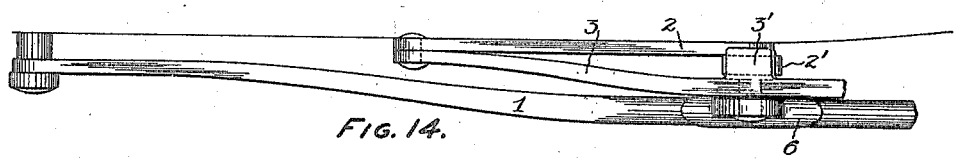
Figure 15:
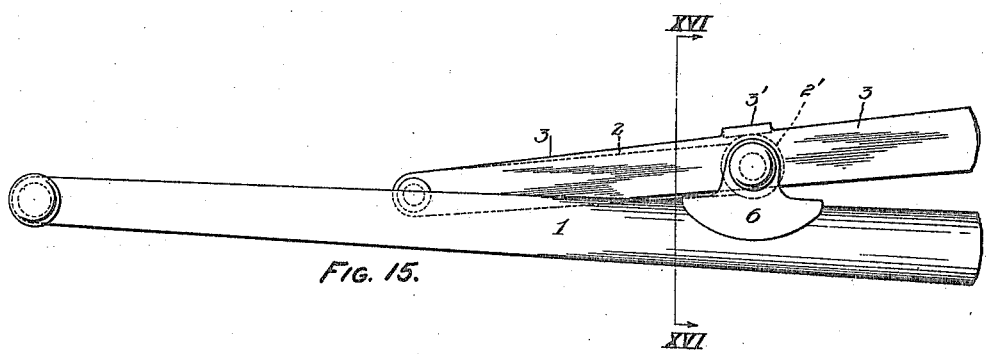
Figure 16:
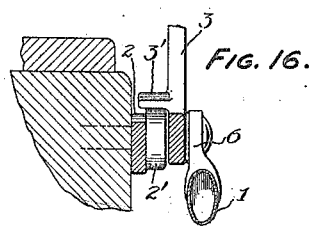

In said annexed drawings:

Figure 1 represents a broken side elevation of an automobile body upon which is mounted one of my improved tops in its extended position; Figures 2 to 5, inclusive, represent, upon an enlarged scale, fragmentary portions of said top, as shown in Figure 1; Figures 6 to 9 inclusive represent transverse sections of the fragmentary portions shown in Figures 2 to 5, taken in the planes indicated by the lines VI—VI, VII—VII, VIII—VIII and IX—IX, Figures 1, 2, 4 and 5; Figure 10 represents a side elevation of the parts shown in Figure 1 after the front end of my improved top has been unfastened from the top of the windshield and the first movement in the folding of the top has taken place, there being also indicated in dotted lines the distance which the front of the top will automatically spring up, as soon as the top is unfastened from the windshield; Figures 11, 12 and 13 represent further movements in the folding of the top; Figure 14 represents, upon an enlarged scale, a plan of certain elements, in their extreme folded position, comprising a rear self-contained, self-supporting bearing member of my improved top, the pivot of one of the bows upon the body being extended outwardly for a purpose hereinafter fully described; Figure 15 represents a side elevation of the parts shown in Figure 14; Figure 16 represents a transverse section, taken in the plane indicated by the line XVI—XVI, Figure 15; and Figure 17 represents a side elevation of said self-contained, self-supporting member provided with an adjustable stop which prevents undue dropping of said member.

Referring to the annexed drawings, a rearwardly extending bow is designated by the ordinal 1 pivoted to the rear of the body of the automobile, to which body is also pivoted at 2′ a cross bow comprising jointed parts 2 and 3, the joint thereof being disposed intermediately the pivotal connection upon the automobile body of said cross bow and a pivotal connection of said cross bow and the rearwardly extending bow 1. The rearwardly extending bow 1 and the bow crossing it and and pivoted to it comprised of the elements 2 and 3 constitute a self-contained, self-supporting bearing and carrying member, as is plainly indicated in Figure 1, thus dispensing with the usual fabric "strainers" provided for maintaining the relative positions of the bows. A lug 6 integrally secured to the rearwardly extending bow 1 and pivotally secured to the member 3 furnishes the specific means for pivotally connecting together the elements of the rear bearing and carrying member. In Figure 12 is illustrated means whereby the joint between 2 and 3 is broken against the tension of a spring member 6′, said tension assisting in lifting the top when it is desired to unfold the same. The members 1 and 3 are braced at their tops by a jointed arm comprising the members 4 and 5; of which the member 4 is pivotally connected to bow 1 and the member 5 is pivotally connected to bow 3. A forwardly extending articulated member comprising the arms 11, 14 and 17, hereinafter described in detail, is supported by the rear self-contained supporting and bearing member. Pivoted to the forward end of the arm 17 is an outrigger bow 19 which is adapted to be secured at its forward end to the automobile body, when the top is in its extended position, the connection herein specifically shown being provided by a headed pin 20 secured to the top of the windshield and adapted to enter a slot in a lug 21 secured to the under side of bow 19 and be secured therein by a screw 22. The rearward end of the arm 11 of the articulated member is pivotally secured to a lug 12 integrally secured to the bow 3.

There are formed upon the articulated member, and supported thereon, three truss members 7, 8 and 9, by the means now to be described. Said means comprise two forwardly and upwardly extending bows 13 and 16 pivoted to the articulated member rearwardly of its two intermediate pivotal points 14' and 14², respectively, and three forwardly and downwardly extending arms 10, 15 and 18, of which 10 is pivoted at its ends, respectively, near the top of the bow 3 and the bottom of the bow 13; of which 15 is pivoted near the top of the bow 13 and the bottom of the bow 16; and of which 18 is pivoted near the top of the bow 16 and to the outrigger bow 19. Said truss members are supported upon the articulated arm by an upturned portion 17' forming an integral rearward end of the arm 17 of the articulated member and by a pin 11' secured to the arm 11 of the articulated member intermediately its ends, as plainly shown in Figure 1, said arm 17 and portion 17' forming a shortening and locking member hereinafter fully described. The bow 16 is formed with integral lugs 16' so spaced as to receive between them the outer end of the supporting and locking portion 17' of the arm 17, as plainly shown in Figures 1, 3 and 7. These lugs, in addition to holding the portion 17' in the desired supporting position, prevent a downward breaking of the joint between the arms 14 and 17 at the pivotal connection 14² when the top is in its extended position, which is accomplished by reason of the fact that such downward breaking, when the top is secured to the windshield, would result in a necessary movement in an axial direction of the bow 16 which is prevented by the contact of the portion 17' with the lugs 16'. In order that there may not be an upward breaking at the junction point of the members 17 and 19 and the junction point of the members 11 and 14, I provide the members 19 and 11 with bottom shoulders 19' and 11², respectively, as plainly shown in Figures 6 and 8. It will be noted that the member 11 really consists of double members, as plainly shown in Figures 8 and 9. By the provision of the comparatively short member 17 of the articulated member, I have shortened the forward fold of the fan-fold shown in Figure 13 to an extent sufficient to enable the same to complete a practicable fan and at the same time have provided at the pivotal point in the articulated member, where I dispose this short member 17, also the locking and supporting member 17', integral with said shortened member 17. I refer particularly to Figure 13 to show the fan-fold construction which I have designed. I do not desire the forward fold to be out of keeping with the progressively shortened folds 1, 3, 13, etc., which is what happens when the forward member of the articulated member is of the length heretofore known, resulting in the top or forward fold reaching back over the adjacent lower folds sometimes as far or farther than the lower-most fold itself.

From the above-described construction and referring to Figures 10, 11, 12 and 13, it will be evident that a release of the forward end of the outrigger bow 19 from the top of the windshield will result in the upward springing of the top as a whole, the same having been snapped down into position and put under stress when said outward end of the outrigger bow 19 was fastened to the windshield, the amount of this upward spring being indicated in dotted lines in Figure 10. Then the downward breaking of the joint between the arm 17 and the outrigger bow 19 will result in the first step in the folding, as illustrated in Figure 10. Pushing rearwardly upon the outrigger bow 19 will result in a downward break at the junction of the arms 11 and 14 and a further folding of the truss members, plainly shown in Figure 11. A still further rearward push upon said outrigger bow 19 will continue the folding and result in a pivotal movement of the bow 1 downwardly, immediately breaking the brace 4—5 and effecting a forward break at the junction of the members 2 and 3, as plainly shown in Figure 12. A continued push upon the outrigger bow 19 will result in a continued downward and rearward pivotal movement of the bow 1 upon the automobile body and bring the parts into the position illustrated in Figure 13.

Although I have shown my improved top in use in connection with the so-called touring car type of automobile, the principles underlying my improved design can be utilized in connection with the car of less seating capacity such as the runabout type, the truss members being dispensed with or a lesser number used, as desired.

Referring particularly to Figures 14 to 17 inclusive, the bow 1 and the jointed bow, comprising the parts 2 and 3, are illustrated in an extremely low rested or supported position upon the side of the automobile body, the bow 1 having been lowered quite below the plane of the pivotal connection 2' of the member 2 with the body, and a supporting lug 3' extending inwardly from the member 3 having been rested upon an extension of the pivotal connection 2', as plainly shown in Figure 16. The desired position for thus supporting the top upon the body can be located at any desired point and the same is intended to be an adaptable, efficient and economical method of supporting the top in its collapsed position and to replace the supporting hook commonly secured to the automobile body. In Figure 17 is illustrated, in addition, a stop member $2^2$, a shank member of which is pivotally secured to the bolt 2', said stop member $2^2$ being secured forwardly of the bolt 2' by means of a screw $2^3$, and upon which stop member the member 2 bears, any settling of the top in the rear or shifting or overbalancing of the weight upon said stop $2^2$ being limited by the bolt of the pivotal point 2'. This construction ordinarily prevents the top being folded into or settling into the extreme lower position shown in Figures 14, 15 and 16, and retains the same substantially in the position shown in Figure 13.

What I claim is:

1. A vehicle top comprising a rear foldable supporting member; an outrigger bow adapted for attachment to the vehicle body; an intermediate articulated member pivotally connected to said rear member and said bow, the forward portion of said articulated member being relatively shortened to complete a fanfold of the top when lowered; and a plurality of pivotally connected bows and arms pivotally supported by said articulated member, said rear member and said bow and forming one or more trusses.

2. A vehicle top comprising a rear self-contained foldable bearing and supporting member; an outrigger bow adapted for attachment to a windshield; an intermediate articulated member pivotally connected to said bearing member and said bow and supported by the former, the forward portion of said articulated member being relatively shortened and formed at its rear end with a supporting member, said articlated member having two pivotal points intermediately of its ends; two upwardly and forwardly extending bows pivoted to said articulated member rearwardly of its two pivoted points, respectively; three downwardly and forwardly extending arms pivoted at their ends, respectively, to said bearing and supporting member and, above said articulated arm, to said upwardly extending bows, and to said outrigger bow, thereby forming three truss members; and means for supporting said truss members including said aforementioned relatively shortened supporting member.

3. A vehicle top comprising, in combination with a vehicle body, a pair of bows pivoted to each other intermediately of their ends and each pivotally secured to the rear portion of said body, one of said bows consisting of relatively pivoted parts in that portion which is disposed between their common pivotal point and the point at which said one bow is pivoted upon the body; means adapted to hold the bows rigid against collapse in either direction, said two bows thus forming a self-supported foldable rear top member; a member extended outwardly from the body adjacently the pivotal point thereon of said one bow; a supporting lug formed upon the upper of the pivotal parts of said bow and adapted to be rested upon said extended member, when the top is lowered; a forwardly extending articulated member supported by said rear top member; and a plurality of relatively pivoted bows and arms supported upon said articulated member, pivotally secured to the latter and to said rear top member, and forming one or more pivoted trusses.

4. A vehicle top comprising, in combination with a vehicle body, a pair of bows pivoted to each other intermediately of their ends and each pivotally secured to the rear portion of said body, one of said bows consisting of relatively pivoted parts in that portion which is disposed between their common pivotal point and the point at which said one bow is pivoted upon the body; means adapted to hold the bows rigid against collapse in either direction, said two bows thus forming a self-supported foldable rear top member; a forwardly extending articulated arm pivotally connected to the upper part of the forward bow of said two bows, said articulated arm having two pivotal points intermediate of its ends; an outrigger bow pivoted to the forward end of said articulated arm and capable of attachment at its forward end to a windshield; two upwardly and forwardly extending bows pivoted to said articulated arm rearwardly of its two pivoted points, respectively; three downwardly and forwardly extending arms pivoted at their ends, respectively, to said forward bow of said two pivoted bows and, above said articulated arm, to said upwardly extending bows, and to said outrigger bow, thereby forming three truss members; means secured to the rear end of the forward member of said articulated arm for supporting certain of said truss members; and means disposed near the forward end of the rear member of said articulated arm for supporting other truss members.

5. A vehicle top comprising, in combination with a vehicle body, a pair of bows pivoted to each other intermediately of their ends and each pivotally secured to the rear portion of said body, one of said bows consisting of relatively pivoted parts in that portion which is disposed between their common pivotal point and the point at which said one bow is pivoted upon the body; means adapted to hold the bows rigid against collapse in either direction, said two bows thus forming a self-supporting foldable rear top member; a forwardly extending articulated arm pivotally connected to the upper part of the forward bow of said two bows, said articulated arm having two pivotal points intermediate of its ends; an outrigger bow pivoted to the forward end of said articulated arm and capable of attachment at its forward end to a windshield; two upwardly and forwardly extending bows pivoted to said articulated arm rearwardly of its two pivoted points, respectively; three forwardly and downwardly extending arms pivoted at their ends, respectively, to said forward bow of said two pivoted bows and, above said articulated arm, to said upwardly extending bows, and to said outrigger bow, thereby forming three truss members; means preventing the upward breaking of the pivotal point connecting said articulated arm and said outrigger bow; means secured to the rear end of the forward member of said articulated arm for supporting certain of said truss members; and means disposed near the forward end of the rear member of said articulated arm for supporting other truss members.

6. A vehicle top comprising, in combination with a vehicle body, a pair of bows pivoted to each other intermediately their ends and each pivotally secured to the rear portion of said body, one of said bows consisting of relatively pivoted parts in that portion which is disposed between their common pivotal point and the point at which said one bow is pivoted upon the body; an arm consisting of two portions relatively pivoted intermediate its ends and pivoted at its rear end to the upper part of the rear bow of said two bows and at its forward end to the upper part of the front bow, said two bows thus forming a self-supporting foldable rear top member; a forwardly extending articulated arm pivotally connected to the upper part of the forward bow of said two bows, said articulated arm having two pivotal points intermediate its ends; an outrigger bow pivoted to the forward end of said articulated arm and capable of attachment at its forward end to a windshield; two upwardly and forwardly extending bows pivoted to said articulated arm rearwardly of its two pivoted points, respectively; three downwardly and forwardly extending arms pivoted at their ends, respectively, to said forward bow of said two pivoted bows and, above said articulated arm, to said upwardly extending bows, and to said outrigger bow, thereby forming three truss members; means preventing the upward breaking of the pivotal joint connecting said articulated arm and said outrigger bow; means secured to the rear end of the forward member of said articulated arm for supporting certain of said truss members; means secured to one of said truss members which, in combination with said supporting member, prevents the downward breaking of the forward pivotal point of said articulated arm; means preventing the upward breaking of said articulated arm at the rear one of its two pivotal points; and means disposed rearwardly of said last-mentioned means and adapted to support other truss members.

Signed by me this 26" day of July, 1918.

GEORGE E. BISHOP.